United States Patent
Yokota

(10) Patent No.: US 6,767,135 B2
(45) Date of Patent: Jul. 27, 2004

(54) ROLLER BEARING CAGE

(75) Inventor: Yasunori Yokota, Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 12 days.

(21) Appl. No.: 10/246,697

(22) Filed: Sep. 19, 2002

(65) Prior Publication Data

US 2003/0053727 A1 Mar. 20, 2003

(30) Foreign Application Priority Data

Sep. 19, 2001 (JP) ........................................ 2001-284536

(51) Int. Cl.[7] .............................................. F16C 33/46
(52) U.S. Cl. ................................................... 384/580
(58) Field of Search ............................. 384/572, 575, 384/580

(56) References Cited

U.S. PATENT DOCUMENTS

| | | | | |
|---|---|---|---|---|
| 3,110,529 A | * | 11/1963 | Schaeffler | ................... 384/580 |
| 3,494,684 A | | 2/1970 | Benson | |
| 3,586,406 A | * | 6/1971 | Barr | ........................... 384/580 |
| 4,797,015 A | * | 1/1989 | Hidano et al. | ............... 384/580 |
| 5,096,311 A | * | 3/1992 | Motohashi et al. | ......... 384/573 |
| 5,172,986 A | | 12/1992 | Yokota | |
| 5,540,506 A | | 7/1996 | Yokota et al. | |
| 5,584,583 A | | 12/1996 | Hidano | |
| 5,803,620 A | | 9/1998 | Yokota | |

FOREIGN PATENT DOCUMENTS

| | | |
|---|---|---|
| EP | 0 919 739 | 6/1999 |
| JP | 124353/1977 | 9/1977 |
| JP | 27526/1994 | 4/1994 |

* cited by examiner

*Primary Examiner*—Thomas R. Hannon
(74) *Attorney, Agent, or Firm*—Browdy and Neimark, P.L.L.C.

(57) ABSTRACT

A roller bearing cage having load capacity large enough to bear severe conditions imposed by high-speed engines, with even lighter in weight. In the roller bearing cage, the cage bars are each made up of axially opposite thick ends and a slim mid-area lying midway the thick ends to define a recess between them. The cage bar has radially outside projections on an outside periphery thereof while radially inside projections on an inside periphery thereof to keep the rollers against escape out of the cage. The radially inside projections extend circumferentially of the cage, especially, at a circular edge of the thick end, which lies nearby or neighboring or closer to the recess. The radially inside projections are made by forcing material at the edge to move circumferentially by plastic flow into the projections that extend circumferentially towards pockets on a radially inside circular surface of the thick end.

9 Claims, 5 Drawing Sheets

ROLLER BEARING CAGE

BACKGROUND OF THE INVENTION

1. Field of the Invention

The present invention relates to a roller bearing cage taken in, for example a lower, larger end called a rod "big end" of a connecting rod in an engine and more particularly to a roller bearing cage of gate-like configuration in axial cross section, which has a radially inside projection to keep a roller in place.

2. Description of the Prior Art

As the modern engines are needed to get further higher in horsepower, the crankshaft for the powerful engines has to be made so as to stand up to further high-speed revolution. To cope with this, the crankpins are made integral with the crank webs to enhance the rigidity or stiffness of the crankshaft. Thus, high-compression, high-speed engines will impose very harsh conditions on the roller bearings that are fitted between the crankshaft and the connecting rod.

An example of conventional bearing cages is disclosed in Japanese Patent Publication No. 27526/1994. As shown in FIGS. 7 and 8, the prior bearing to be interposed between the big end 35 of the connecting rod and the associated crankpin 36 in the engine is a sort of needle bearing including a number of needle rollers 22 and a cage 21 made in a configuration resembling any gate in axial cross section. With the roller bearing cage recited earlier, the cage 21 is comprised of circular rims 23 and cage bars 24 to provide pockets 28. The cage bars 24 are each made radially thick at axially opposite end areas 25 thereof while radially reduced at an axial middle area 26 thereof. The radially thick area 25 of the cage bar 24 has radially inside prongs 27 disposed midway between axially opposing edges thereof to keep the rollers 22 against their radially inward escape out of the cage 21. On the slim middle area 26 of the cage bar 24, moreover, there are provided radially outside projections 32 extending circumferentially out of an outside circular surface 30 of the cage bar 24 to keep the rollers 22 against their radially outward escape from the cage 21. The radially inside prongs 27 are made by coining grooves 31 on the inside circular surface 29 of the radially thick area 25 of the cage bar 24 to extrude the material by plastic flow towards the associated pocket 6. In return for the radially inside prongs 27 there are left the circumferential grooves 31 that are each sunk radially outwards below the inside circular surface 29 of the radially thick area 25.

Another example of the roller bearing cage is disclosed in Japanese Utility Model Laid-Open No. 124353/1977. The prior roller bearing cage is also directed to the provision of a roller retainer to keep the rollers against their radially inside escape out of the cage. The roller retainer is made of radially inside retainer projections that are placed at radially inside circumferential edges of circular rims, with extending towards axially inside the cage.

Modern high-compression, high-speed engines increasingly need the bearing cage for the big end of the connecting rod, which can carry well the heavy load and bear the much higher rpm than previously thought.

SUMMARY OF THE INVENTION

The present invention has for its primary object to resolve the major problem as stated earlier, and to provide a roller bearing cage most available for bearings in, for example a rod big-end of a connecting rod in modern high-compression, high-speed engines and more particularly to a roller bearing cage that makes certain of keeping rollers against escape out of the cage, making fabrication thereof much easier, permitting large varieties of cages in size to be made with easy processing management, and further much favorable for the needle bearings, which can carry well a large load, with even weighing less under the harsh conditions imposed by high-compression, high-speed engines.

The present invention is concerned with a roller bearing cage in which a roller bearing cage comprising, a cage composed of a pair of circular rims spaced apart from one another in an axial direction and cage bars positioned circumferentially at a-regular intervals between the rims and made integrally with the rims to form a pocket between any two adjacent cage bars, and rollers fit in the pockets, one to each pocket, the cage bars being each composed of thick ends lying in axial opposition to each other to provide guide surfaces on which the roller rolls and a slim mid-portion extending between the thick ends to provide a recess, and the cage bars each having a radially outside projection on an outside circular surface thereof while a radially inside projection on an inside circular surface thereof to keep the associated roller against escape out of the cage, and wherein the radially inside projection is made in a way extending circumferentially at a circular edge on the thick end.

In an aspect of the present invention, there is provided a roller bearing cage in which the radially inside projection is formed by forcing only the circular edge on the thick end to move by plastic flow into such a shape as extending circumferentially out of an inside circular surface on the thick end into the pocket. In the roller bearing cage constructed as stated earlier, moreover, plastic deformation at the circular edge on the thick end is done by a coining roll that is forcibly urged against the circular edge on the thick end.

In another aspect of the present invention, there is provided a roller bearing cage in which forming the radially inside projection at a circular edge on the inside circular surface of the thick end contributes to lessening an axial length of the thick end, which provides the guide surface on which the roller rolls. For example, the axial length of any one of the axially opposing thick ends can be reduced to the extent accounting for only some 11% to 15% of the overall axial length of the pocket. That is to say, forming the radially inside projection to keep the roller against escape from the cage at just the circular edge on the thick end contributes to lessening the axial length of the guide surface on which the roller rolls, compared with the prior cage in which the radially inside projection lies midway between the lengthwise opposing edges on the thick end, thereby yielding a weight saving on the overall weight of the cage, helping provide the roller bearing cage that is fitter to stand up to the high-speed rpm of the engines.

In another aspect of the present invention, there is provided a roller bearing cage in which forming the radially inside projection at the circular edge on the inside circular surface of the thick end helps render the inside circular surface of the thick end larger in inside diameter, thereby making it possible to reduce a circular interval between any two adjacent pockets. This enlargement of the inside diameter defining the inside circular surface on the thick end makes it possible to lessen a circumferential width of the pocket that has been commonly cut by punching operation, and in doing so the pockets defined between any two adjacent cage bars are allowed to increase by about one to two in their number. This eventually results in the increase of the number of the rollers accommodated in the pockets in the cage, thus ensuring the increase of load capacity in the roller bearing cage itself.

In a further another aspect of the present invention, there is provided a roller bearing cage in which forming the radially inside projection at the circular edge on the thick end results in rendering the inside circular surface of the thick end larger in inside diameter, thereby making the thick end slim in thickness direction. That is to say, the expansion of the inside diameter at the thick end of the cage bar leads to making the thick end slim in thickness direction, and in doing so the roller bearing cage of the present invention could realize a weight saving on its overall weight, becoming fitter to stand up to the high-speed rpm of the engines than the prior cage previously known.

In another aspect of the present invention, there is provided a roller bearing cage in which the thick end of the cage bar is made either equal or unequal with rim in their radial thickness.

In a further another aspect of the present invention, there is provided a roller bearing cage that can serve as a needle bearing applicable to a big end of a connecting rod in an engine.

With the roller bearing cage constructed as stated earlier, the radially inside projection to keep the roller against radially inward escape out of the cage can be readily made at the circular edge on the thick end, which lies open to the recess. In other words, the edge on the thick end, compared with any other part, may be much subject to plastic deformation into the radially inside projection by the use of forming tools such as the coining roll.

Forming operation by the coining roll according to the present invention, moreover, is easy in process management to control the plastic deformation at any desired magnitude, thus making it possible to finish the radially inside projection with high accuracy. Gently plastic flow at the edge makes certain of the radially inside projection that may be kept from making uneven engagement with the roller, complying with the high-speed revolution of the bearings with less subject to failure of lubrication. Moreover, the plastic flow caused by the coining roll at the edge makes sure of simplification and high precision of the forming operation. The roller bearing cage constructed as stated earlier according to the present invention weighs less in itself and lessens the contact pressure that might occur between the inside circular surface in the rod big-end and the outside circular surface of the roller bearing cage due to the centrifugal force imposed by high-speed revolution, thereby effectively preventing lubrication failure and binding between parts, and treating further high-speed revolution of engines.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 6:
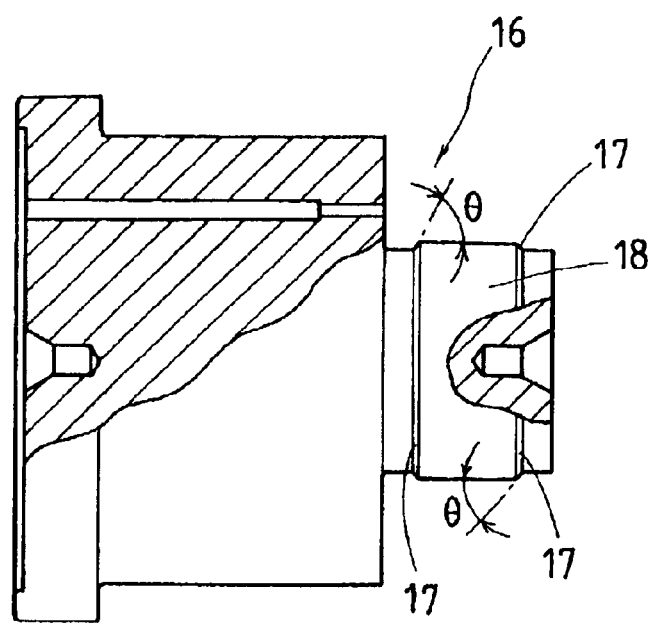
FIG. 6 is an explanatory view, partly broken away, of a coining tool to force the material by plastic flow to make a radially inside projection on a cage bar of the roller bearing cage of the present invention along only a circular edge of a thick area in the cage bar, which edge is nearby a slim mid-area of the cage bar.

A preferred embodiment of a roller bearing cage according to the present invention will be explained below with reference to FIGS. 1 to 4 and also FIG. 6 showing a coining tool designed especially to make the roller bearing cage of the present invention by plastic flow.

The roller bearing cage of the present invention is marked by a cage 1 having a configuration in cross section resembling a gate to be used in a form of a needle bearing fitted in a rod big-end 35 of a connecting rod of an engine. The roller bearing cage is used in a way interposed between the big end 35 of the connecting rod and a connecting-rod journal, or crankpin 36 of a crankshaft. Thus, the roller bearing cage of the present invention is mainly comprised the cage 1 with more than one pocket 8 to be interposed between the rod big end 35 and the crankpin 36, and a roller 2 held in the pocket 8 to be allowed to run a pitch circle lying on a pitch circle diameter P.C.D.

The cage 1 is composed of a pair of circular rims 3 extending circumferentially and spaced axially apart from one another, and more than one cage bar 4 positioned at regular intervals around the rims 3 and made integral with the rims 3 to connect the rims 3 to each other. The cage bar 4 includes thick areas 5 arranged at axially opposite ends to provide guide surfaces 14 on which the roller 2 is allowed to roll, and a slim mid-area 6 extending between the lengthwise opposing thick areas 5 to provide an axial recess 19 there. The roller 2 is accommodated in the pocket 8 open between any two adjacent cage bars 4 among the cage bars 4 that are arranged at regular intervals circumferentially of the cage 1. With the roller bearing cage constructed as stated earlier, the cage 1 has a radially outside projection 11 at a radially outside surface 10 of the slim mid-area 6 in the cage bar 4, which outside surface 10 lies on the radially outside circumference around the cage 1. The cage 1 is also made with a radially inside projection 7 at the thick area 5 of the cage bar 4, which defines the radially inside circumference of the cage 1. Both the radially outside and inside projections 11 and 7 are to keep the roller 2 against escape out of the associated pocket 8 open between any two adjacent cage bars 4.

The roller bearing cage of the present invention features the radially inside projection 7 that is made on the thick area 5 of the cage bar 4 so as to extrude circumferentially at only a circular edge 12 on the thick area 5, which edge is neighboring or closer to the axial recess 19 or the slim mid-area 6 of the cage bar 4. Forming the radially inside projection 7 at just one circular edge 12 on the thick area 5 can be carried out with a plastic-working process in which a coining roll 16 placed previously inside the cage 1 forces the material at the circular edge 12 to move into the shape of the radially inside projection 7 by plastic flow. The coining roll 16 has a form cylinder 18 having axially opposing circular ends 17 cut slantwise at a preselected angle θ.

The form cylinder 18 is inserted deep into the recess 19 of the cage bar 4 in such a way any one of the circular ends 17 is pressed against the circular edge 12 of the thick area 5. Then, the form cylinder 18, as moving along the circular edge 12 while spinning on its own axis, forces the material at the circular edge 12 to move into the shape conforming with the slantwise end 17 by plastic flow, thereby making the radially inside projection 7 extending circumferentially of the cage 1. With the coining roll 16 constructed as stated above, the preselected angle θ of the slantwise end 17 of the form cylinder 18 is preferably determined to set the slant surface of the radially inside projection 7 to any angle from 15 degrees to 45 degrees with respect to the axial direction of the cage 1. In the embodiment discussed here it is set about 45 degrees. The radially inside projection 7 at the circular edge 12 on the thick area 5 can be easily formed by plastic flow that might result from coining force far less than the force needed to conventionally coin the radially inside projection on the thick area 25 at any portion midway between axially opposing edges thereof.

Figure 3:
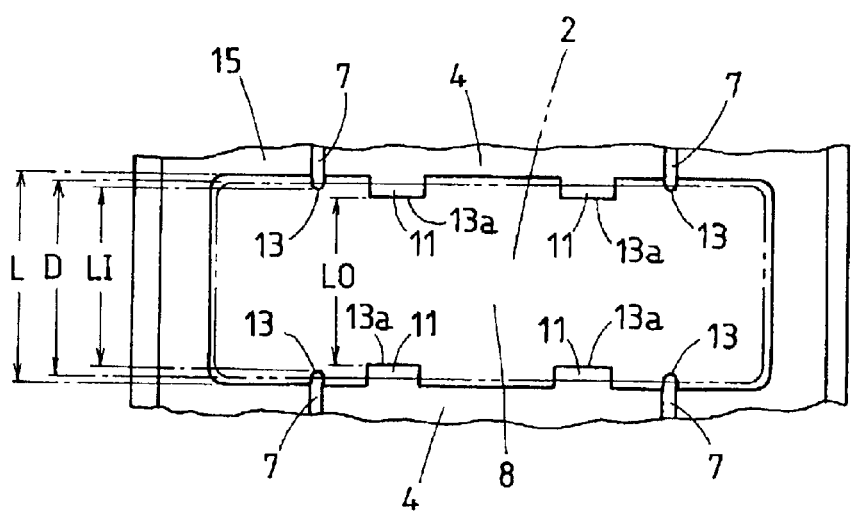
FIG. 3 is an enlarged plan view of another portion labeled B in the roller bearing cage of FIG. 1, as viewing the pocket from the inside of the cage.
Figure 4:
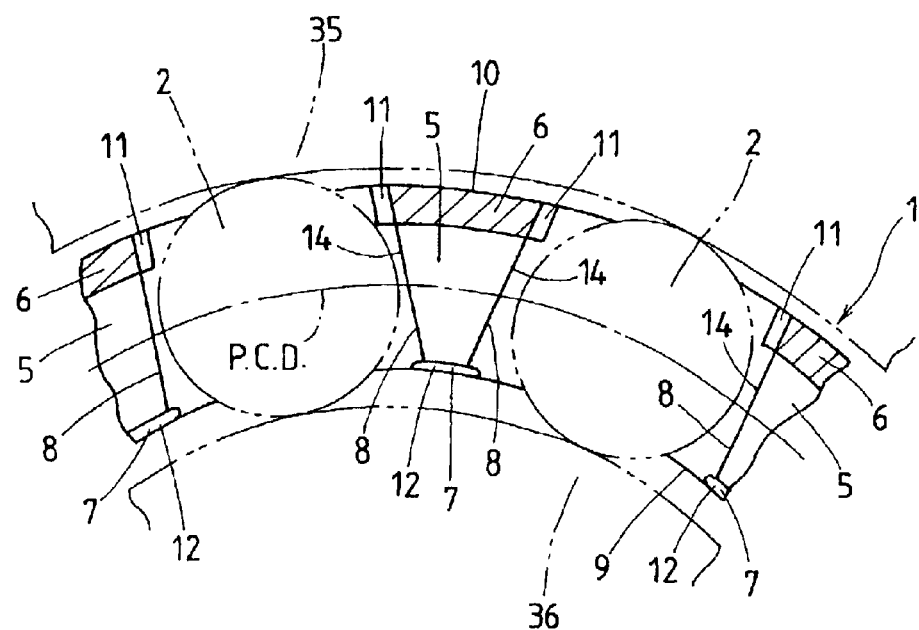
FIG. 4 is a fragmentary sectional view taken along a mid-plane normal to the axial direction of the roller bearing cage shown in FIG. 1.

The radially inside projection 7, as illustrated in FIG. 3, extends circumferentially into the associated pocket 8 to a reach where extremities 13 of the radially inside projections 7 opposite circumferentially to each other are spaced away from one another by at least distance L1 less than a diameter D of the roller 2. Thus, the radially inside projections 7 can serve well to keep the roller 2 against radially inward escape out of the cage 1. Moreover, the radially outside projections 11 extend in opposition circumferentially into the associated pocket 8 to an extent that extremities 13a of the radially outside projections 11 opposite circumferentially to each other are separated from one another by at least distance L0 less than a diameter D of the roller 2. It will be understood that the radially outside projections 11 are to keep the roller 2 against radially outward escape out of the cage 1. That is to say, both the radially inside and outside projections 7 and 11 are needed to hold the rollers 2 together, keeping the rollers 2 against getting spread apart before assembly, thereby making assemblage of the roller bearing easier, but not to make direct contact with the rollers 2 after once assembled. Direct contact of the rollers 2 with any radially inside and outside projections 7 and 11 might cause binding between the rod big-end and the rod journal, contributing to preventing the big end 35 of the connecting rod to smoothly follow the crankpin as it swings in a circle around the crankshaft. Although but the radially outside projection 11 in the embodiment stated earlier is shown as being formed on the slim area 6 of the cage bar 4, it will be appreciated that the outside projection may be made the thick area 5 of the cage bar 4.

Figure 1:
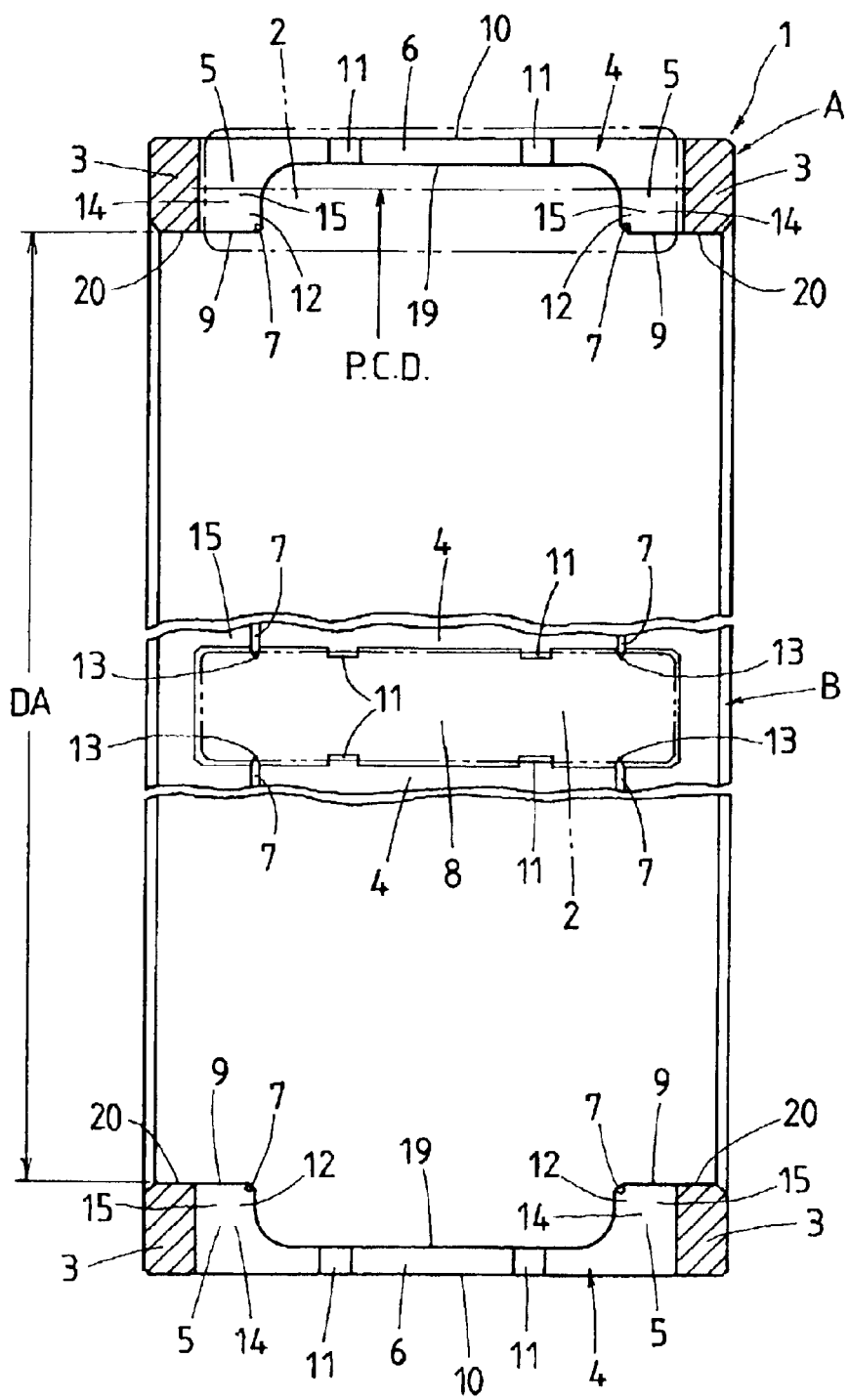
FIG. 1 is an axial cross-sectional view, partially broken away, of a preferred embodiment of a roller bearing cage according to the present invention, especially showing some pockets in the cage.
Figure 2:
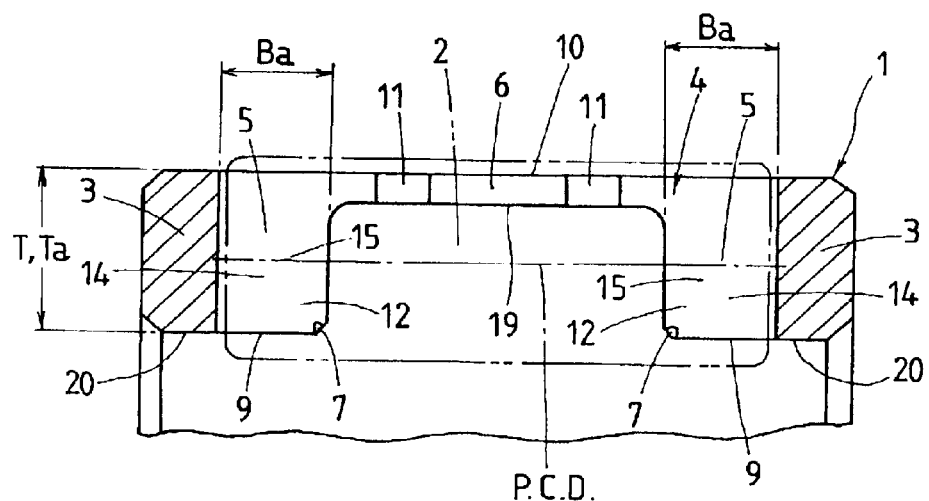
FIG. 2 is an enlarged fragmentary section of a portion labeled A in the roller bearing cage of FIG. 1.
Figure 7:
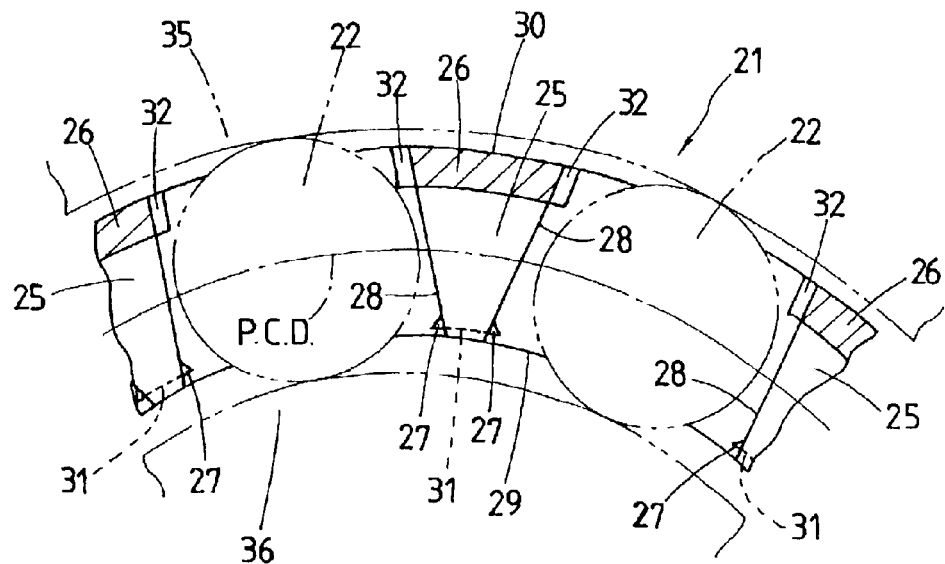
FIG. 7 is an enlarged fragmentary view corresponding to FIG. 4, but showing a conventional roller bearing cage.
Figure 8:
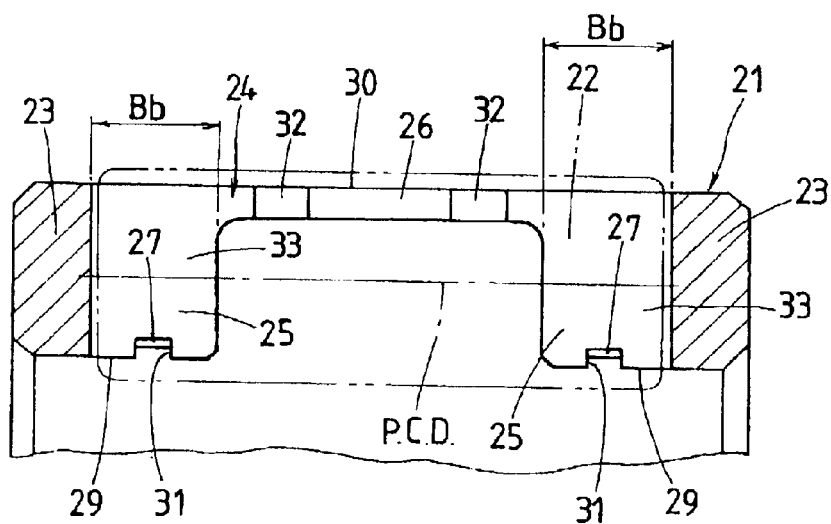
FIG. 8 is an enlarged fragmentary section corresponding to FIG. 2, but showing a conventional roller bearing cage.

With the roller bearing cage in which the radially inside projection 7 on the thick area 5 is made at just the circular edge 12 neighboring or closer to the axial recess 19 of the cage bar 4, the guide surface 14 of the thick area 5 or the guide area 15 on which the roller 2 is allowed to roll, as shown in FIG. 2, can be made less in an axial length Ba thereof than an axial length Bb of a guide surface 33 in the prior roller bearing cage shown in FIGS. 7 and 8. For example, the axial length Ba of any one of the axially opposing thick areas 5 or guide areas 15 can be reduced to the extent accounting for only some 11% to 15% of the overall axial length of the pocket. In other words, the axial length Ba of the thick area 5 could be lessened by roughly 6% to 2%, compared with the axial length Bb of the prior thick area, which has made up to about 17% of the overall axial length of the pocket. Reducing the axial length Ba of the guide area 15 could result in a weight saving on the overall weight of the cage 1, helping provide the roller bearing cage that is fitter to stand up to the high-speed rpm of the engines. With the cage 1 shown in FIG. 1, moreover, the circular rim 3 is made to have an inside circumferential periphery 20 identical in diameter with an inside circular surface 9 on the thick area 5 of the cage bar 4.

Unlike the prior art of the radially inside projection 27 formed in a way sunken below the inside circular surface 9 on the thick area 5 in return for coining the circumferential groove 31 by plastic flow, the radially inside projection 7 according to the present invention lies on the inside circular surface 9 on the thick area 5 at only the edge 12 neighboring or closer to the recess 19, correspondingly helping increase an inside diameter DA, shown in FIG. 1, of the inside circular surface 9 on the thick area 5. The enlargement of the inside diameter DA defining the inside circular surface 9 makes it possible to lessen a circumferential width L of the pocket 8 that has been commonly cut by punching operation, and in doing so the pockets 8 defined between any two adjacent cage bars 4 are allowed to increase by about one to two in their number. This eventually results in the increase of the number of the rollers accommodated in the cage 1, thus ensuring the increase of load capacity in the roller bearing cage.

Increasing the inside diameter DA defining the inside circular surface 9 on the thick area 5, moreover, contributes to rendering the thick area 5 reduced in radial thickness Ta thereof, thereby realizing a weight saving on the overall weight of the cage 1 to make the roller bearing cage fitter to stand up to the high-speed rpm of the engines.

Figure 5:
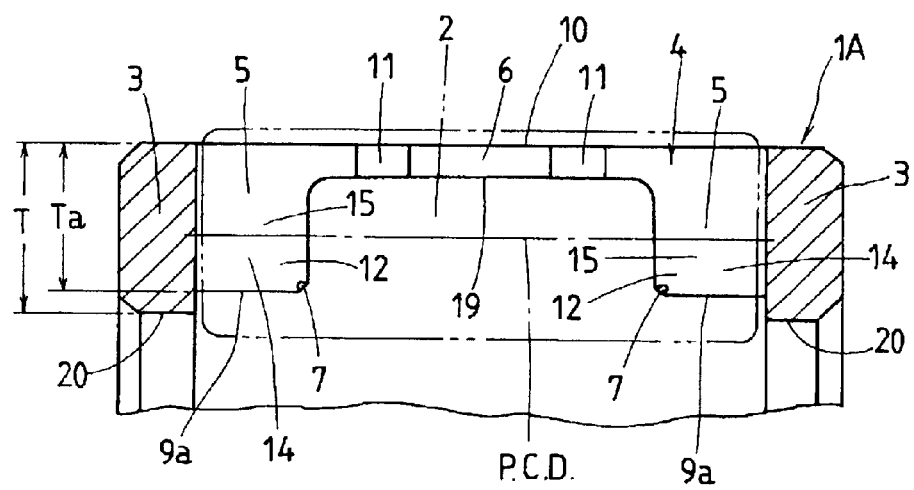
FIG. 5 is an enlarged fragmentary view of another embodiment of a roller bearing cage according to the present invention, showing a portion corresponding to the portion labeled A in FIG. 1.

Referring now to FIG. 5, there is shown another embodiment of the roller bearing cage in accordance with the present invention. This alternative cage 1A is the same in construction as the cage 1 shown in FIGS. 1 to 4, except that a radial dimension Ta of the thick area 5 is different from the radial thickness T of the rim 3. To that extent, the components or parts identical in construction or in function have been given the same characters, so that the previous description concerning the cage 1 will be applicable to the alternative cage 1A.

Like the cage 1 stated earlier, the alternative cage 1A is mainly composed of the circular rims 3 and the cage bars 4 that includes the thick area 5 and the slim area 6. The thick area 5 has an inside circular surface 9a lying offset radially outwards with respect to the inside circumferential periphery 20 of the rim 3, and correspondingly the guide surface 14 on the guide area 15 can be reduced in radial dimension. As a result, the cage bar 4 can be made less in weight to the extent effective to the weight saving of the roller bearing cage and also made easy to form the radially inside projection 7.

This discussion will present how the coining roll 16 shown in FIG. 6 forces the circular edge 12 of the thick area 5 in the cage 1, 1A to move into new shape by plastic flow. The coining roll 16 is first placed inside the cage 1, 1A. When the coining roll 16 is radially outwards moved while spinning on its own axis, the form cylinder 18 of the coining roll 16 is inserted deep in the recess 19 inside the cage 1, 1A to make press-contact with the circular edge 12 of the thick area 5 at any one of the slantwise ends 17 of the form cylinder 18. The cage 1, 1A starts revolving after the slantwise end 17 of the form cylinder 18 has made engagement with the associated circular edge 12 of the thick area 5. As the form cylinder 18 moves radially outwards to forcibly urge the slantwise end 17 against the circular edge 12 of the thick area 5, the slantwise end 17 operates to force the circular edge 12 of the thick area 5 to move by plastic flow into the radially inside projection 7 that extends across the cage bar 4 circumferentially of the cage 1, 1A. It is to be noted that the angle θ of the slantwise end 17 plays an important role in plastic-working to form the radially inside projection 7. When the angle θ of the slantwise end 17 is more than 45 degrees, the force for plastic flow will dominantly act in the axial direction of the cage 1, 1A, thus working to expand the recess 19 instead of forcing the circular edge 12 to move into the projection by plastic flow. Considering how axial component and radial component of the force for plastic flow balance out, it will be preferred that the angle θ of the slantwise end 17 is not more than 45 degrees. In contrast, less than 15 degrees of the angle θ negatively affects on formation of the radially inside projection 7 because the exerted force mainly acts on the inside circular surface 9 as in the prior art, causing too large force for plastic flow. Thus, the angle θ of the radially inside projection is preferably within the range of from 15 degrees to 45 degrees.

For production of the roller bearing cage in which the radially inside projections 7 are formed at the circular edges 12 by plastic flow, the present invention provides the coining roll 16 including the form cylinder 18 that has the axially opposing ends 17 to force the circular edges 12 to move into the radially inside projections 7 by plastic flow. The axially opposing ends 17 each lie slantwise at the angle θ of from 15 degrees to 45 degrees with respect to the circular edge 12. When the coining roll 16 with the form cylinder 18 fit deep in the recess 19 of the cage bar 4 is moved circumferentially while spinning with being forcibly urged radially outwards, the circular edge 12 is forced to move into the radially inside projections 7 that extend circumferentially in opposition into the adjacent pockets 8 out of the inside circular surfaces 9, 9a on the thick area 5. The radially inside projection 7 formed as stated earlier does not need any axial room or space on the thick area 5, which would be conventionally spent to provide the prior radially inside projection 27. Thus, the present invention makes it possible to reduce the guide surface 14 on the guide area 15 in axial length, resulting in the weight saving of the cage 1, 1A.

In accordance with the present invention, moreover, as forcing a material to move into the radially inside projection 7 by plastic flow takes place at the circular edge 12 instead of at the circular surface as in the prior radially inside projection 27, the plastic deformation can be readily accomplished with even less force or load to cause plastic flow than previously required. Residual stress as well as any deformation resulting from heat treatment can be also reduced. Plastic deformation made at just circular edge 12 closer to the recess 19 in the cage bar 4 enables to make the cage bar 4 of the cage 1, 1A much greater in inside diameter compared with the prior cage bar, and further make the thick area 5 slim in radial dimension thereof, helping make a remarkable weight saving on the overall weight of the cage itself. The cage bar large in inside diameter thereof results in lessening the interval between any adjacent punched pockets 8 on inside circumference, thereby increasing the number of the pockets 8, for example from 19 permitted previously up to 20 or 22, helping raise the load rating of the roller bearing.

What is claimed is:

1. A roller bearing cage comprising, a cage composed of a pair of circular rims spaced apart from one another in an axial direction and cage bars positioned circumferentially at regular intervals between the rims and made integrally with the rims to form a pocket between any two adjacent cage bars, and rollers fit in the pockets, one to each pocket, the cage bars being each composed of thick ends lying in axial opposition to each other to provide guide surfaces on which the roller rolls and a slim mid-portion extending between the thick ends to provide a recess, and the cage bars each having a radially outside projection on an outside circular surface thereof while a radially inside projection on an inside circular surface thereof to keep the associated roller from escaping out of the cage, and wherein the radially inside projection is made in a way extending circumferentially at a circular edge of the cage bar on the thick end.

2. A roller bearing cage constructed as defined in claim 1, wherein the radially inside projection is formed by forcing only the circular edge on the thick end to move by plastic flow into such a shape as extending circumferentially out of an inside circular surface on the thick end into the pocket.

3. A roller bearing cage constructed as defined in claim 2, wherein plastic deformation at the circular edge on the thick end is done by a coining roll that is forcibly urged against the circular edge on the thick end.

4. A roller bearing cage constructed as defined in claim 1, wherein the circular edge on the thick end after plastic deformation lies slantwise at an angle ranging from 15 degrees to 45 degrees with respect to the axial direction.

5. A roller bearing cage constructed as defined in claim 1, wherein forming the radially inside projection at just the circular edge on the inside circular surface of the thick end contributes to lessening an axial length of the thick end, which provides the guide surface on which the roller rolls.

6. A roller bearing cage constructed as defined in claim 1, wherein forming the radially inside projection at the circular edge on the inside circular surface of the thick end results in rendering the inside circular surface of the thick end larger in inside diameter, thereby making it possible to reduce a circular interval between any two adjacent pockets.

7. A roller bearing cage constructed as defined in claim 6, wherein forming the radially inside projection at the circular edge on the inside circular surface of the thick end results in rendering the inside circular surface of the thick end larger in inside diameter, thereby making the thick end slim in thickness.

8. A roller bearing cage constructed as defined in claim 1, wherein the thick end of the cage bar is made either equal or unequal with rim in their radial thickness.

9. A roller bearing cage constructed as defined in claim 1, which serves as a needle bearing applicable to a big end of a connecting rod in an engine.

* * * * *